US010803400B2

(12) United States Patent
Sindia et al.

(10) Patent No.: US 10,803,400 B2
(45) Date of Patent: Oct. 13, 2020

(54) SELF-ADAPTIVE SECURITY FRAMEWORK

(71) Applicant: Intel Corporation, Santa Clara, CA (US)

(72) Inventors: Suraj Sindia, Hillsboro, OR (US); Lital Shiryan, Ramat Gan (IL); Tamir Damian Munafo, Har-Hotzbim (IL); Santosh Ghosh, Hillsboro, OR (US); Balkaran Gill, Cornelius, OR (US)

(73) Assignee: Intel Corporation, Santa Clara, CA (US)

(*) Notice: Subject to any disclaimer, the term of this patent is extended or adjusted under 35 U.S.C. 154(b) by 966 days.

(21) Appl. No.: 15/191,469

(22) Filed: Jun. 23, 2016

(65) Prior Publication Data
US 2017/0372059 A1 Dec. 28, 2017

(51) Int. Cl.
G06F 21/32 (2013.01)
H04L 29/06 (2006.01)
G06N 20/00 (2019.01)
G06N 3/08 (2006.01)
H04W 12/00 (2009.01)

(52) U.S. Cl.
CPC ............ *G06N 20/00* (2019.01); *G06F 21/32* (2013.01); *H04L 63/08* (2013.01); *G06F 2221/2111* (2013.01); *G06F 2221/2113* (2013.01); *G06N 3/088* (2013.01); *H04L 63/0861* (2013.01); *H04L 2463/082* (2013.01); *H04W 12/00503* (2019.01); *H04W 12/00505* (2019.01)

(58) Field of Classification Search
CPC ...... H04L 63/105; H04L 63/08; H04W 12/06; H04W 12/08; G06F 21/44; G06F 21/45; G06F 21/50; G06F 21/32; G06N 99/005
See application file for complete search history.

(56) References Cited

U.S. PATENT DOCUMENTS 9,282,086 B2* 3/2016 Klein ................... H04L 63/08
2006/0282660 A1* 12/2006 Varghese ............ G06Q 20/341
713/155

(Continued)

OTHER PUBLICATIONS

Check Point, "The Impact of Mobile Devices on Information Security: A Survey of IT Professionals." Dimensional Research; Jun. 2013; pp. 1-12.

(Continued)

Primary Examiner — Amir Mehrmanesh
(74) Attorney, Agent, or Firm — Schiff Hardin LLP

(57) ABSTRACT

A self-adaptive security framework for a device is disclosed. A first security level for a device is set wherein the first security level comprises procedures that authenticate a user and allow the user to access the device. Input from sensors associated with the device may be received at a contextual sensing engine, wherein the input at least includes location data, and wherein at least a portion of the input is related to a physical setting where the device is located. A threat level for the device is determined in the physical setting via the contextual sensing engine based on analyzing the input. The first security level is altered to a second security level to provide an altered threat response for the device based on the threat level wherein the second security level has different procedures to authenticate the user compared to the first security level.

25 Claims, 7 Drawing Sheets

(56) References Cited

U.S. PATENT DOCUMENTS

2015/0150122 A1* 5/2015 Son .................... G06F 21/34
  726/20
2015/0350207 A1* 12/2015 Kim .................... H04L 63/105
  713/170
2016/0314308 A1* 10/2016 Suzuki .............. H04M 1/72577
2017/0142589 A1* 5/2017 Park ...................... H04W 12/08

OTHER PUBLICATIONS

Citrix, "Contextual Security Is Key to Enabling Business Mobility." Nov. 18, 2014; Accessed on Jun. 23, 2016; 2 Pages.

Intel, "Intel® Context Sensing SDK." Intel; Version 1.6.7; 2015; Accessed Feb. 23, 2016; pp. 1-10.

Mathworks, "Crosscorr." Documentation. http://www.mathworks.com/help/econ/crosscorr.html?requestedDomain=www.math 8 Pages.

Mostefaoui et al, "Modeling Context-Based Security Policies With Contextual Graphs." Pervasive Computing and Communications Workshops; IEEE; Mar. 14-17, 2004; 5 Pages.

Ponemon Institute, "The Billion Dollar Lost Laptop Problem Benchmark Study of U.S. Organizations." Intel; Oct. 31, 2010; pp. 1-12.

Preda et al, "Architecture-Aware Adaptive Deployment of Contextual Security Policies." Availability, Reliability, and Security, 2010. ARES '10 International Conference; IEEE; Feb. 15-18, 2010; 9 Pages.

Stackexchange, "How Can an Artificial Neural Network ANN, Be used for Unsupervised Clustering?" https://stats.stackexchange.com/questions/140148/how-can-an-artificial-neural-network-ann-be-used-for-unsupervised-clustering; Cross Validated; 4 Pages.

Warren, "Preventing Laptop Theft and Data Lost." http://www.securitymagazine.com/articles/83456-preventing-laptop-theft-and-data-loss; Accessed on Aug. 24, 2015. 8 Pages.

Wikipedia, "Security through Obscurity." https://en.wikipedia.org/wiki/Security_through_obsecurity ; 3 Pages.

* cited by examiner

| Sensor inputs | Temperature | Pressure | Touchscreen activity | Proximity | Microphone | Gyro | Location feed | Social media activity |
|---|---|---|---|---|---|---|---|---|
| Temperature | 1.00 | -0.15 | 0.41 | 0.75 | -0.13 | 0.28 | 0.18 | 0.20 |
| Pressure | -0.15 | 1.00 | 0.04 | -0.23 | -0.22 | -0.30 | -0.24 | 0.37 |
| Touchscreen activity | 0.41 | 0.04 | 1.00 | 0.66 | -0.19 | 0.13 | 0.46 | 0.31 |
| Proximity | 0.75 | -0.23 | 0.66 | 1.00 | -0.16 | 0.43 | 0.25 | 0.28 |
| Microphone | -0.13 | -0.22 | -0.19 | -0.16 | 1.00 | 0.17 | -0.12 | 0.12 |
| Gyro | 0.28 | -0.30 | 0.13 | 0.43 | 0.17 | 1.00 | 0.05 | 0.05 |
| Location feed | 0.18 | -0.24 | 0.46 | 0.25 | -0.12 | 0.05 | 1.00 | -0.04 |
| Social media activity | 0.20 | 0.37 | 0.31 | 0.28 | 0.12 | 0.05 | -0.04 | 1.00 |

400

Mutual correlation between sensor outputs over unit epoch period

FIG. 4

SELF-ADAPTIVE SECURITY FRAMEWORK

BACKGROUND

Computer and electronic devices have become integral to the lives of many and are used in various different settings. For example, a device may be used in a relatively secure environment such as in a user's home while the same device may also be used in an unsecure environment in a public setting. A device may or may not have security protocols that the user can manually change. Typically, the more secure a device is made the more inconvenient or less user friendly it becomes.

BRIEF DESCRIPTION OF THE DRAWINGS

Features and advantages of the embodiments will be apparent from the detailed description which follows, taken in conjunction with the accompanying drawings, which together illustrate, by way of example, embodiment features; and, wherein:

FIG. 4 is a chart depicting a cross correlation matrix;

Figure 1:
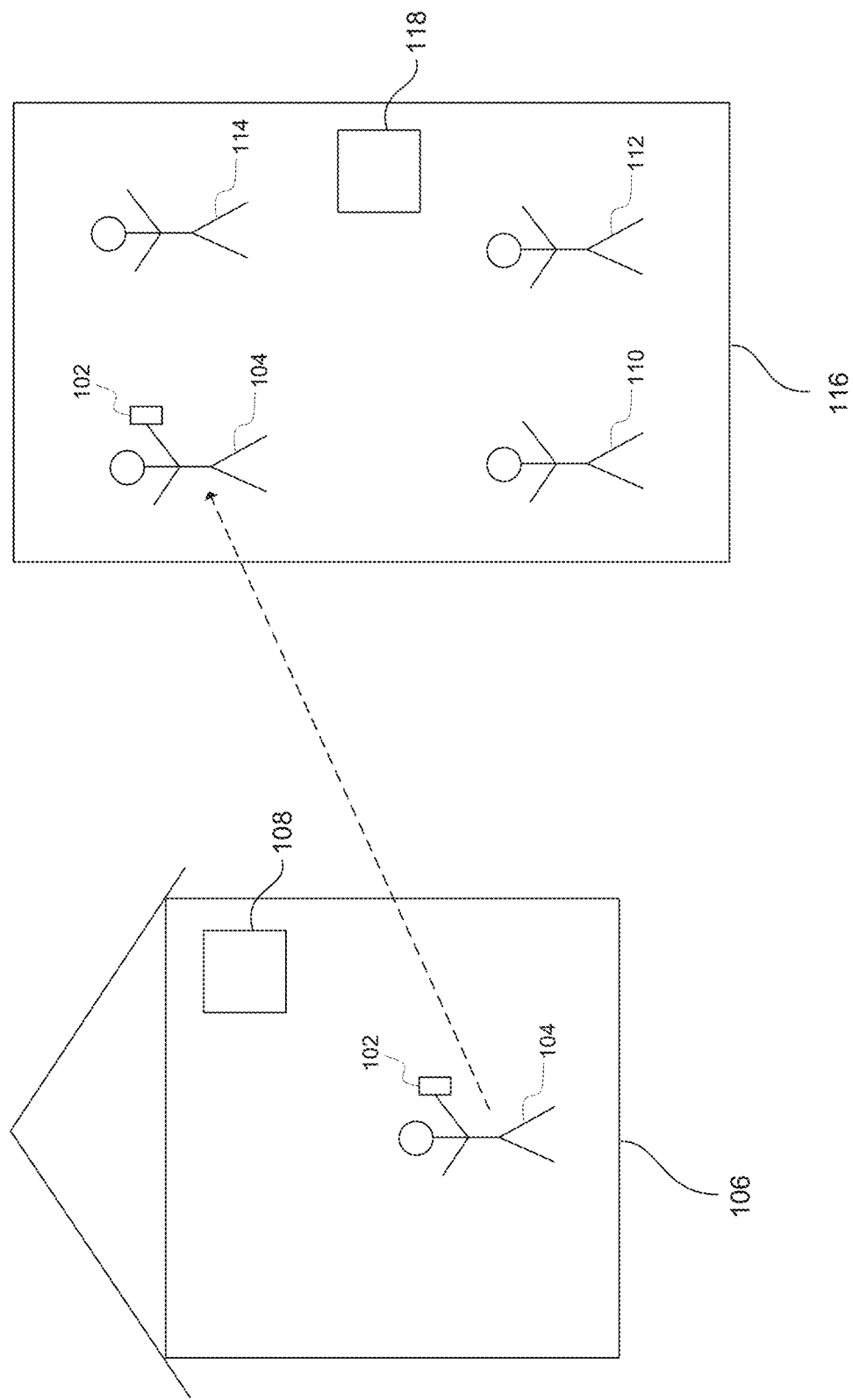
FIG. 1 is a schematic view of an exemplary device in environments.

Reference will now be made to the exemplary embodiments illustrated, and specific language will be used herein to describe the same. It will nevertheless be understood that no limitation on invention scope is thereby intended.

DESCRIPTION OF EMBODIMENTS

Although the following detailed description contains many specifics for the purpose of illustration, a person of ordinary skill in the art will appreciate that many variations and alterations to the following details can be made and are considered included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence. Furthermore, the described features, structures, or characteristics can be combined in any suitable manner in one or more embodiments.

Unless defined otherwise, all technical and scientific terms used herein have the same meaning as commonly understood by one of ordinary skill in the art to which this disclosure belongs.

As used in this written description, the singular forms "a," "an" and "the" include support for plural referents unless the context clearly dictates otherwise. Thus, for example, reference to "a bit line" includes support for a plurality of such bit lines.

In this application, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of electrical or physical connection or attachment between one item and another item, and includes relationships of either direct or indirect connection or attachment. Any number of items can be coupled, such as materials, components, structures, layers, devices, objects, etc.

As used herein, "directly coupled" refers to a relationship of electrical or physical connection or attachment between one item and another item where the items have at least one point of direct physical contact or otherwise touch one another. For example, when one layer of material is deposited on or against another layer of material, the layers can be said to be directly coupled.

Objects or structures described herein as being "adjacent to" each other may be in physical contact with each other, in close proximity to each other, or in the same general region or area as each other, as appropriate for the context in which the phrase is used.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of the embodiments is provided below and specific embodiments are then described in further detail. This initial summary is intended to aid readers in understanding the disclosure more quickly, but is not intended to identify key or essential technological features, nor is it intended to limit the scope of the claimed subject matter.

A computing device may be mobile and may be used in several different settings for physical settings or environments. Each environment may pose a different threat level to the mobile device. For example, a mobile device being used in a user's home may be in a secure environment while the same mobile device being used in a public venue such as at a concert or in a mall is in a less secure setting and is at greater risk. The mobile device may have various security protocols that restrict access to the device. For example, the device may require a swipe or a password to be entered before the device can be accessed. Any number of protocols may be employed to authenticate a user before access is granted. A mobile device may have a default security setting that may be manually changed by a user. For example, the default security protocol on a device may only be to require a swipe on a touchscreen before a user is granted access to the device, but a user may manually change this setting to require a password or a personal identification number (PIN) to be entered before access is given to a device.

As a user moves the devices to different settings, the user may manually adjust the security protocols on a device. Different combinations of security protocols may also be employed such as multi-factor authentication. However, the more secure a device is made, the less convenient the device may be to use. A user may find it annoying or too inconvenient to employ multi-factor authentication on a device especially when the device is being used in a secure environment. A user may also find it too inconvenient to manually change the security protocols each time the device is brought into a different setting. Such a manual technique many require several changes to be made manually in a short amount of time. When given a choice, users most often select usability of the device over more stringent security measures. Users may also set weak passwords to make the device more usable. Thus, a user may select the same security protocol or security level for the device to be employed in all settings. The invention overcomes these limitation or inconvenience by providing a self-adaptive security framework. The self-adaptive security framework automatically adjusts or alters the security level of a device. The security level may be increased or decreased based on a threat level determined by a contextual sensing engine in the self-adaptive security framework. In one aspect, the invention determines that a threat level has not changed and maintains the previously set security level. The invention alters the security level without requiring the user manually change or adjust security protocols. Thus, the invention provides flexible security levels based on the context or setting in which the device is being used. In one aspect, the user is not aware that a change has been made to the security level of the device until the user attempts to access the device, this allows the security levels to be changed without requiring the user to be aware that a change should take place. In one aspect, the self-adaptive security framework alters the security level and results in improved performance of the device by conserving resources or improving battery life. The invention may be referred to as a multi-modal context-sensed adaptive security framework.

In one aspect, the self-adaptive security framework is smart and knows when threat levels have been elevated and when a security levels should be altered accordingly. For example, the self-adaptive security framework may rely upon input from sensors to determine at a contextual sensing engine that the threat level has been elevated and the contextual sensing engine responds by altering the security level of the device to a more stringent security protocol. For example, a user may be in a setting where it is determined that only a single password is required to access the device. Subsequently, the self-adaptive security framework determines that the threat level has increased and automatically responds by altering the security level to require multi-factor authentication to access the device. Thus, if the user loses custody of the device due to theft or other threats, then the device is more secure. Changes in threat level may come about by moving the device from one physical setting to another or may come by changes made to the physical setting. By decreasing security in more secure settings, the invention makes the device more usable and convenient. In one aspect, the self-adaptive security framework may determine that a threat level has not changed. For example, a user may stay in the same physical setting, but the self-adaptive security framework periodically determines that the threat level has not changed. In a different example, the user may move the device to a different physical setting and the self-adaptive security framework may determine that the threat level is the same as the previous threat level in the previous physical setting. In response, the self-adaptive security framework may maintain or not alter the security level of the device because the threat level is the same or is categorized as the same. Therefore, the self-adaptive security framework may alter, by increasing or decreasing, or not alter a security level of a device.

In one aspect, the self-adaptive security framework has a predetermined number of threat levels that are used to categorize threats. The self-adaptive security framework may have a predetermined response or security level to enact for each of the different threat levels. In one aspect, the self-adaptive security framework relies upon a plurality of different types of sensors and other input data to determine the threat level. Sensor may be directly connect to or associated with the device or may be external to the device such as Internet of Things (IoT) sensors. The devices which employ the self-adaptive security framework of the invention may be any number of different types of devices such as smart phones, hand held electronics, laptops, notebooks, tablets, personal digital assistants, IoT devices, wearable devices, etc.

FIG. 1 shows a schematic view of an exemplary device in different settings. A setting 106 may be a physical setting or an environment in which a user 104 employs a device 102. It should be appreciated that the device 102 may refer to any electronic device that employs security protocols. The device 102 may refer to smart phones, hand held electronics, laptops, notebooks, tablets, personal digital assistants, IoT devices, wearable devices, etc. In one aspect, the device 102 comprises a self-adaptive security framework. The setting 106 may be a relatively secure environment such as the home of the user 104. In one aspect, the device 102 comprises a sensor or sensors for generating data to be used by the self-adaptive security framework of the device 102.

The setting 106 may comprise additional sensors external to the device 102 such as the sensor 108. The sensor 108 may send data to the device 102 using various techniques such as wireless transmissions including Bluetooth. The sensors, including sensor 108, generate data such as environmental temperature data, location data, social network data, calendar data, event data, biometric data related to the user, body temperature data, heart rate data, image data, perceptual computing data, time data, accelerometer data, movement data, WiFi data, Internet Protocol (IP) address data, Global Navigation Satellite System (GNSS) data, Global Positioning System (GPS) data, watch dog timer data, and any combination thereof. The sensors are not limited to these types of data and the self-adaptive security framework may make use of these types of data as well as other types of data including data from future sensors.

In one aspect, the self-adaptive security framework at the device 102 employs input from sensors to determine a threat level for the device 102 in the setting 106 and then sets a first threat level for the device 102. For example, if the setting 106 is a secure setting such as the home of user 104, then the first threat level may be relatively low and may only require a swipe or a single password for user 104 to access the device 102. The self-adaptive security framework may sample data from the sensors on a periodic basis to continually assess the threat level to the device 102. While the user 104 is in the setting 106 the threat level may not change. However, changes to the environment of the setting 106 may change and then the self-adaptive security framework will alter the first security level to a second security level accordingly.

In one aspect, subsequent to employing the device 102 in setting 106, the user 104 may move the device 102 to setting 116. This is indicated by the dotted line in FIG. 1. It should be appreciated that the setting 106 may be more or less secure compared to the setting 116. While the user is in the setting 116, the self-adaptive security framework of the device 102 continues to determine the threat level posed to the device now in the setting 116. This may be performed by receiving input from the sensors associated with the device 102 and with sensors associated with the setting 116 such as the sensor 118. The sensor 118 may have all the same features and capabilities of the sensor 108. In one aspect, the setting 116 is a more public setting compared to the setting 106. For example, the setting 116 may be a mall, a concert, or an outdoor venue where members of the public may associate with one another. The people 110, 112, and 114 depict people other than the user 104 in the setting 116. The people 110, 112, and 114 may or may not be known to the user 104. In one aspect, the self-adaptive security framework determines that the threat level to the device 102 is greater in the setting 116 compared to the threat level in the setting 106 and therefore the security level should be changed. The self-adaptive security framework may then alter the security level from a first security level to a second security level. For example, while the first security level in the setting 106 required only a swipe or single password, the second security level in the setting 116 may require multi-factor authentication. Alternatively, the response to the second security level may be to hibernate the device 102 or some other action.

Figure 2:
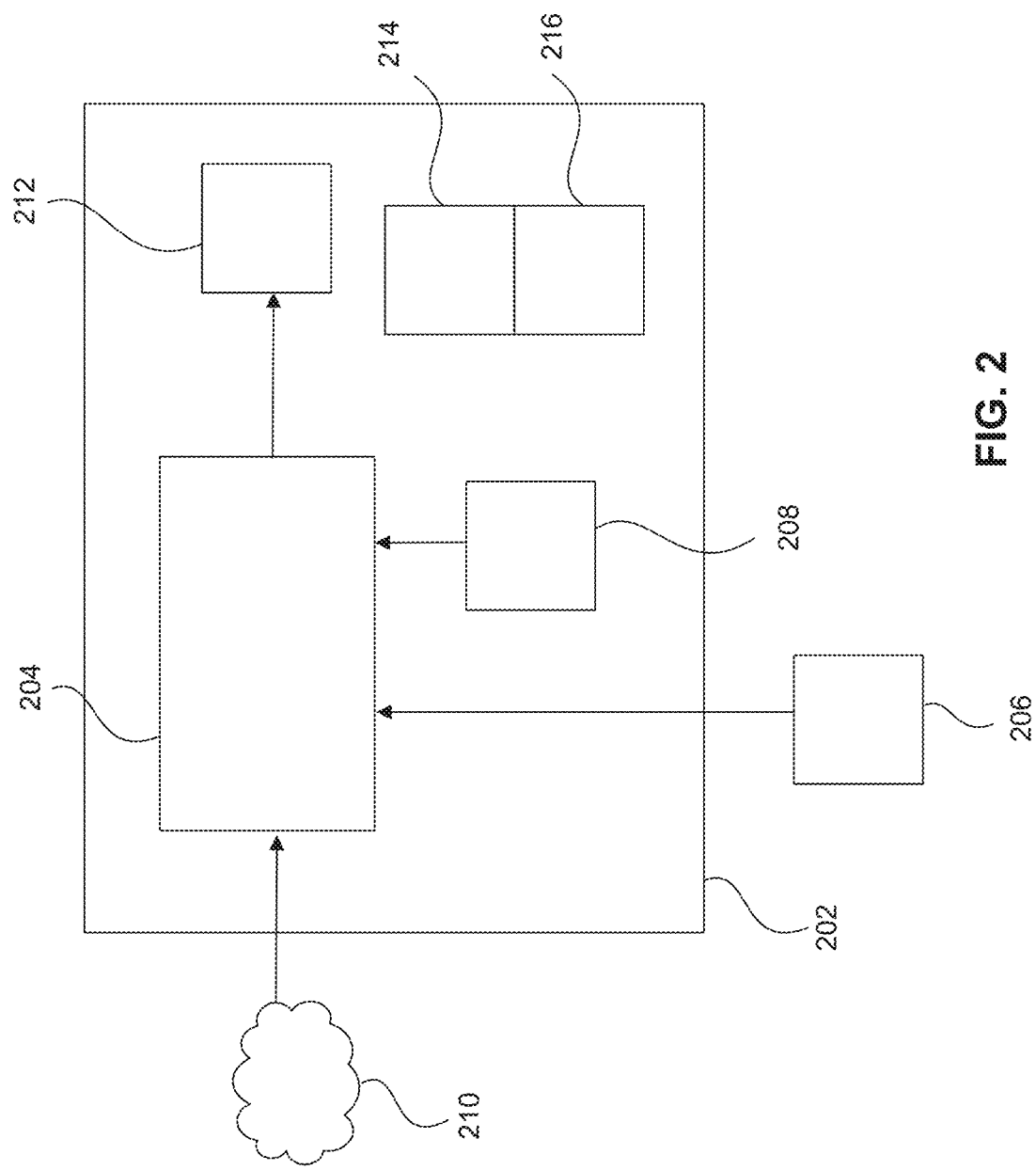
FIG. 2 is a schematic view of an exemplary device.

FIG. 2 shows a schematic view of an exemplary device. The device 202 may have all the features or capabilities of the device 102 of FIG. 1. The device 202 may have built in sensors such as the device sensor 208 or may employ sensors in the surrounding setting or environment such as external sensor 206. It should be appreciated that while FIG. 2 only depicts one device sensor and one external sensor, the invention may employ any number of sensors. The sensors, such as device sensor 208 and external sensor 206, generate data that is then sent to the contextual sensing engine 204. The contextual sensing engine 204 may also receive data from a sensor that is a component attached to or otherwise associated with the device 202. The sensors may communicate with the device via wired or wireless connections and may employ protocols such as Bluetooth or WiFi. The sensors may have privacy settings that can be adjusted to determine what or how much information the contextual sensing engine 204 is allowed to access. The sensors may be, but are not limited to, location sensors, time sensors or clocks, watch dog timers, thermometers, biometric sensors, cameras, accelerometers, gyros, network interface components, etc. The data generated by the sensors may include environmental temperature data, location data, social network data, calendar data, event data biometric data related to the user, body temperature data, heart rate data, image data, perceptual computing data, time data, accelerometer data, movement data, WiFi data, Internet Protocol (IP) address data, Global Navigation Satellite System (GNSS) data, Global Positioning System (GPS) data, watch dog timer data, pressure data, touchscreen activity data, proximity data, microphone or audio data, and any combination thereof.

In one aspect, the contextual sensing engine 204 is able to determine the location of the device based on the data gathered from the sensors. For example, the sensors may directly generate location data and send it to the contextual sensing engine 204. In a different example, the contextual sensing engine 204 may infer the location of the device 202 based on data that does not directly identify the location on the device 202. The contextual sensing engine 204 may use triangulation techniques from data coming from WiFi IP addresses or other localized positional tracking system.

In one aspect, the contextual sensing engine 204 receives data from the social media activity 210. The social media activity 210 refers to data and information received from social media posting made by the user. For example, the contextual sensing engine 204 may have access, grated by the user, to a social media account associated with the user. The contextual sensing engine 204 can then interpret or analyze text and other data from the user's postings to the social media account. These interpretations may be employed to determine a location of the user, emotions the user is feeling, events taking place within the physical setting where the device is located, etc. The contextual sensing engine 204 may interpret the text based on the frequency a word is used, the context in which a word is used, or other techniques. In one aspect, the contextual sensing engine 204 has access to a news feed associated with the social media activity 210 and the news feed is then analyzed to make determinations regarding the threat level. In one aspect, the user may set privacy settings for the social media account to govern what data the contextual sensing engine 204 is allowed to access.

In one aspect, other types of input data to the contextual sensing engine 204 may include data captured by or generated by the device 202 including the user's calendar activity, event information, email text (captured as sentiment and frequency), audio or music activity, ambient noise captured from microphone.

The contextual sensing engine 204 receives this data from the sensors in a continuous fashion. The frequency of the data received may be based on the sensor. For example, temperature data may be sent less frequently than other types of data such as heart rate data. The frequency of the data received may be determined by the contextual sensing engine 204 or the sensor itself. The contextual sensing engine 204 may elect to sample some data on a predetermined periodic basis or may sample some data in response to an event such as a change in physical location. A predetermined time period may be referred to as an epoch. In one aspect, an epoch is minutes long.

In one aspect, the contextual sensing engine 204 samples, collects, or receives raw sensor data from an epoch and then normalizes the data. The raw data may be normalized relative to the maximum value in each sensor data stream. Data normalization harmonizes data streams from various channels since each sensing channel can have its own minimum and maximum values. Normalization can make the minimum and maximum values in each sensed channel 1.0 and 0.0 respectively. Subsequent to the normalization of each sensed channel, cross-correlation among each pair of sensed channel is computed. In one aspect, the mutual cross-correlation between each pair of sensed channels once computed for a given epoch period, populates a cross-correlation matrix. The cross correlation matrix may be employed by the contextual sensing engine 204 to determine the threat level to a device.

In one aspect, the contextual sensing engine 204 may be referred to as a neural-network based unsupervised learning machine. The cross-correlation matrix may be collected over multiple epochs to determine the relevance of each sensed parameter to the bigger context that is to be unraveled. In one aspect, the contextual sensing engine 204 classifies or determines a threat level to fall into one of a predetermined number of threat levels. For example, the self-adaptive security framework may employ four disparate threat levels meaning that the combined threats to a device are determined to fall into one of the four threat levels. The four disparate threat levels may be referred to as L1-L4. In one aspect, the contextual sensing engine 204 employs a winner-take-all approach where the highest output, meaning the greatest threat, is determined to be the threat level for the device 202. In one aspect, the contextual sensing engine 204 employs a single output k-means cluster to designate the four clusters corresponding to the four threat levels L1-L4. The threat level is then output from the contextual sensing engine 204 and goes to the threat responder 212 that determines the appropriate security features to be enabled for each of the four threat levels L1-L4. The threat responder 212 may also be referred to as a security enclave. The device 202 also comprises the processor 214 and the memory 216 which are configured to execute the contextual sensing engine 204 and the threat responder 212. Examples of security levels or protocols that may be implemented or altered by the threat responder 212 may include no authentication, a swipe, two-factor authentication, a single password, gait authentication, active theft detection, a personal identification number authentication, a strong password, voice authentication, fingerprint authentication, biometric authentication, and any combination thereof. In one aspect, the threat responder 212 determines a response to be carried by the device 202 in response to the determination made by the contextual sensing engine 204. Such responses may include hibernation, total memory encryption, network sync removal, auto-power down, and theft detection initiation.

The invention improves the performance of a device by automating the altering of a security level based on a threat response determined in a setting. For example, a default or manually set security level for a device may be to hibernate after there is no activity from a user during a period of time.

The invention may determine that the security threat to a device is low and in response the security level is lowered so that the device is not forced into hibernation on a regular basis. Going into hibernation and coming back represents a large power loss that can be automatically avoided by the invention. Moreover, other security features may represent a resource drain on the device and the invention may reduce the frequency of these security features thus reduces the resource drain on the device and improving overall performance. Additionally, more stringent security employed when necessary improves the technology by protecting the device from threats with more stringent security levels in response to increased threats automatically.

Employing the cross correlation matrix may be referred to as a clustering technique. It should be appreciated that the invention is not limited to clustering and the use of a cross correlation matrix. As an alternative, in one aspect, the contextual sensing engine 204 employs a Bayesian context-mining engine. Bayesian context-mining may refer to Bayesian inference meaning a method of statistical inference in which Bayes' theorem is used to update the probability for a hypothesis as more evidence or information becomes available. In various aspects of the invention, the contextual sensing engine 204 may employ a linear or non-linear regression model based on the device and the environment where the device will be used.

In clustering, groups of similar cross correlation matrices are lumped together in clusters. The number of clusters formed can be specified, or automatically inferred. The inference of number of clusters formed and the cross correlation matrices belonging to each of these clusters occurs over the course of the clustering process, depending on the likeness of cross correlation matrices to each other. The likeness of one cross correlation matrix to another can, for example, be determined by a distance measure such as sum of element-wise Euclidean distance defined in equation 1, $$\|C_{xy}^1 - C_{xy}^2\| = \Sigma_{k=1}^{k=N}(C_{xy}^1(k) - C_{xy}^2(k))^2 \quad \text{Equation 1}$$

where $C_{xy}^1$ and $C_{xy}^2$ are two cross correlation matrices, and N is the total number of elements in the cross correlation matrix.

Linear regression models the conditional probability distributions of y given the input variables $x_1, x_2, \ldots x_N$ in the form of equation 2, $$Y = \Sigma_i x_i \beta_i \quad \text{Equation 2}$$

where $\beta_i$ is a scalar, real-valued number that is to be found in the course of solving the linear regression problem based on the pairs of $x_1, x_2, \ldots x_N$ and Y values we know.

In case of non-linear regression, the above equation 2 relating $x_1, x_2, \ldots x_N$ and Y can be an exponential, or polynomial, or sinusoidal, or any generalized function that is not linear as defined in the summation above. Two example non-linear regression functions between $x_1, x_2, \ldots x_N$ and Y are shown in equation 3 and equation 4.

$$Y = \Sigma_i \Sigma_j e^{\beta_j x_i},$$

$$Y = \Sigma_i \Sigma_j \beta_j x_i^j. \quad \text{Equation 3}$$

Equation 4 It should be appreciated that the contextual sensing engine 204 and the threat responder 212 may be implemented into one or several different layers of the device 202. For example, portions or all of the invention may be implemented in the hardware itself, the operation system, or in an application layer, or a combination thereof.

Figure 3:
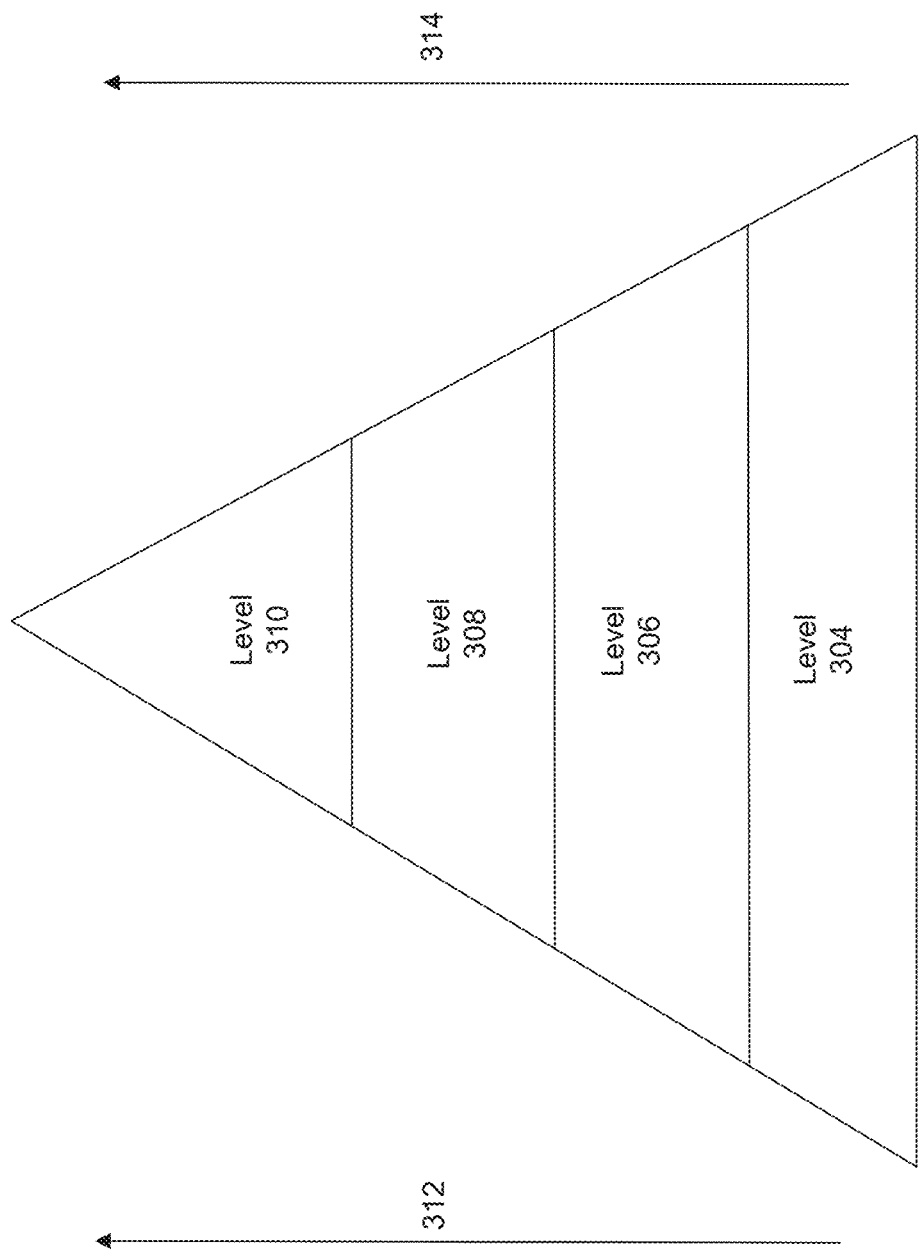
FIG. 3 is a chart depicting threat levels.

FIG. 3 depicts a chart of threat levels. FIG. 3 depicts four disparate levels of threat level 304, level 306, level 308, and level 310. The four disparate levels of threat are a construct or classification employed by the contextual sensing engine of the self-adaptive security framework to classify or determine a threat. It should be appreciated that that any number of threat levels are contemplated by the invention and various combinations of threats to device may make distinctions between threat levels infinitesimally small. By assigning the disparate or discrete levels to a limited number, such as four, it is possible to quickly classify a threat. In one aspect, the various levels may be described as a follows: level 304 is self-assured, level 306 is alter-reliance, level 308 is tertiary-reliance, and level 310 is unreliable. The threat level 312 goes up with each level where the greatest threat to the device is at level 310. The security level or the security enforced 314 also goes up with each level where the most relaxed security is enforced at level 304 and the most stringent security is enforced at level 310. The contextual sensing engine 204 of FIG. 2 may determine, based on sensor data, that the threat level is one of these four levels. The threat responder 212 of FIG. 2 then determines how to alter the security level of the device. Each of these levels will be discussed in turn.

A self-assured threat level may be at home or in an office cubicle, where the user can be self-assured about the safety of the user's devices that are actively used. The security settings at a self-assured level can be relatively relaxed. For example, when the user is at home, his or her phone may be opened by swipe alone, with no key or passcode needed to unlock it. Routine security to protect from the network may continue to be in place, for example firewall against known malicious sites, additional alerts on visiting non-https sites, and so on. Based on the site of the device and nature of the application or web site being accessed by the user, correspondingly appropriate levels of security will be enforced on that particular website.

An alter-reliance level may be descriptive of the vast majority of consumer IoT devices. At this level, a user may rely on another known device or a known person for the safety of the device. Examples include when a user is outdoors or when at a neighbors' home. The security proffered here is higher than the self-assured workplace or home setting, but will be significantly lower than what would be at an unmonitored public location where the system goes into an automatic hibernate, requiring much tighter controls for access. To follow the example above, the user's device may adapt to the context change by requiring a passcode to unlock the screen instead of just swiping it.

A tertiary-reliance level is a window between alter-reliance and unreliable levels. A representative situation for this level is where a user trusts a stranger to watch the device at a public location while the user was elsewhere such as going to the restroom for a bio-break or when the user is at the mall or other setting with many people around. The device may adapt to this level of security with requiring a multi factor authentication.

An unreliable level is representative of the vast majority of industrial-IoT devices where the devices themselves may be in user control, but they are not monitored and there is no assurance as to the security of the device, or extremely crowded places such as a pool or café where pickpockets or other theft is risky. The user device may adapt to this new context and in addition to the passcodes, trigger a theft detection mechanism that will automatically work in such situations. For IoT devices examples include a water temperature monitor in a swimming pool, humidity or rainwater level monitor for weather forecasting, deep sea oil exploration, drones for reconnaissance, etc.

FIG. 4 depicts an exemplary chart 400 of a cross correlation matrix. The mutual cross-correlation between each pair of sensed channels once computed for a given epoch period, populates the cross-correlation matrix as shown in chart 400. Chart 400 depicts outputs for temperature, pressure, touchscreen activity, proximity, microphone, gyro, location feed, calendar data, event information, and social media activity.

Figure 5:
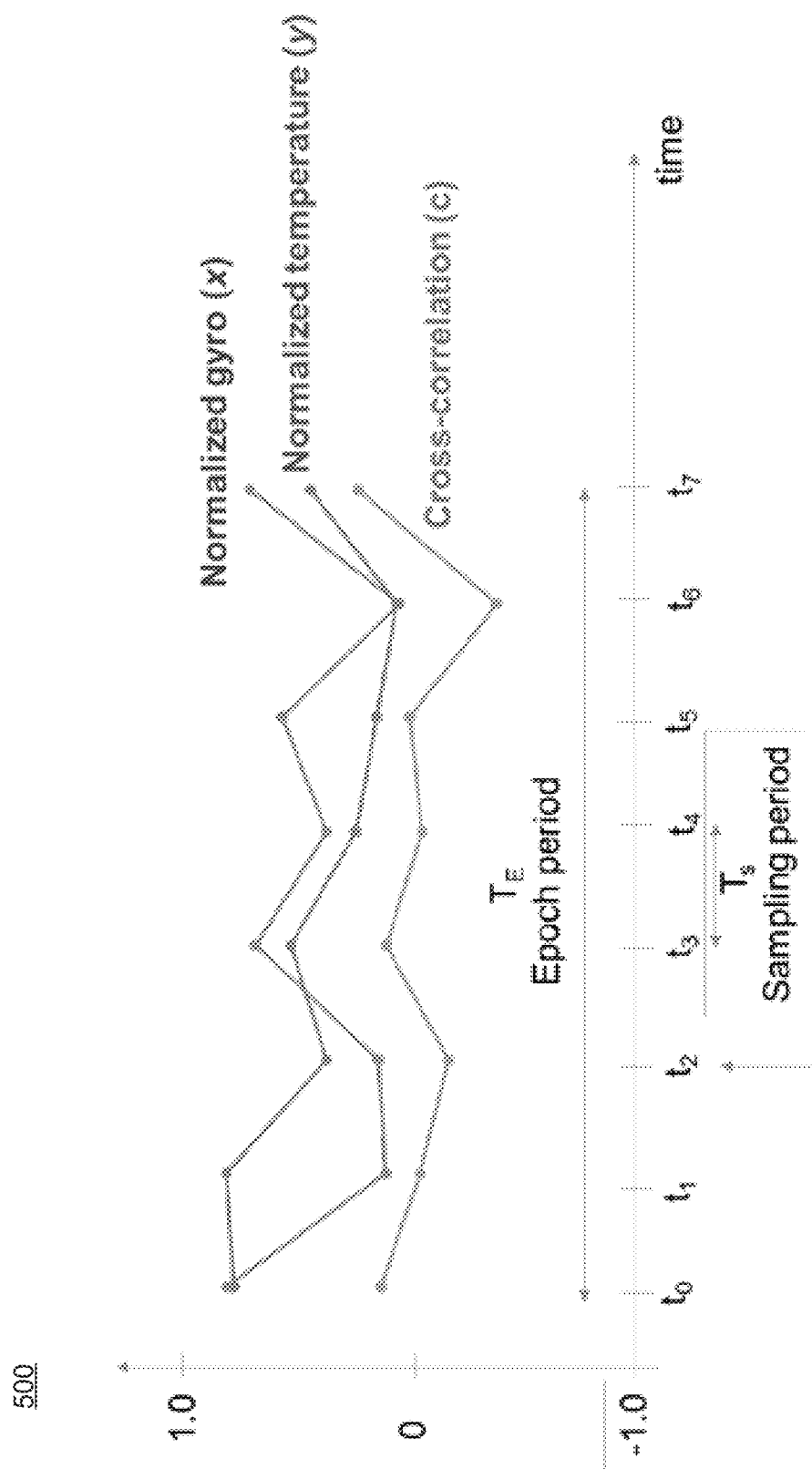
FIG. 5 is a chart depicting sampled data.

FIG. 5 depicts an exemplary chart 500 of sensor activity. Sensor activity cross-correlation is computer between every pair of sensed parameters at each sampling instant over one epoch period to develop the activity cross-correlation matrix. The data from a gyro and temperature are each normalized and depicted in chart 400. Chart 400 then depicts the resulting cross-correlation. $T_S$ and $T_E$ are the time duration between two consecutive samples and the duration over which samples are collected before cross-correlation is computed. In chart 400 $T_S$ is 1 second and $T_E$ is 8 seconds.

In one aspect, to compute a cross-correlation between two sensed parameters x and y, the covariance $c_{xy}$ between them is found using equation 5 below, $$c_{xy}(k) = \begin{cases} \frac{1}{n}\sum_{i=1}^{n-k}(x_i - \bar{x})(y_{i+k} - \bar{y}) & k = 0, 1, 2, \ldots \\ \frac{1}{n}\sum_{i=1}^{n+k}(y_i - \bar{y})(x_{i-k} - \bar{x}) & k = 0, -1, -2, \ldots \end{cases} \quad \text{Equation 5}$$

The cross-correlation $r_{xy}$ is found using equation 6, $$r_{xy}(k) = \frac{c_{xy}(k)}{s_x s_y} \quad k = 0, \pm 1, \pm 2, \ldots \quad \text{Equation 6}$$

Where $s_x$ and $s_y$ are defined equations 7 and 8, $$s_x = \sqrt{c_{xx}(0)} \quad \text{Equation 7}$$

$$s_y = \sqrt{c_{yy}(0)} \quad \text{Equation 8}$$

Figure 6:
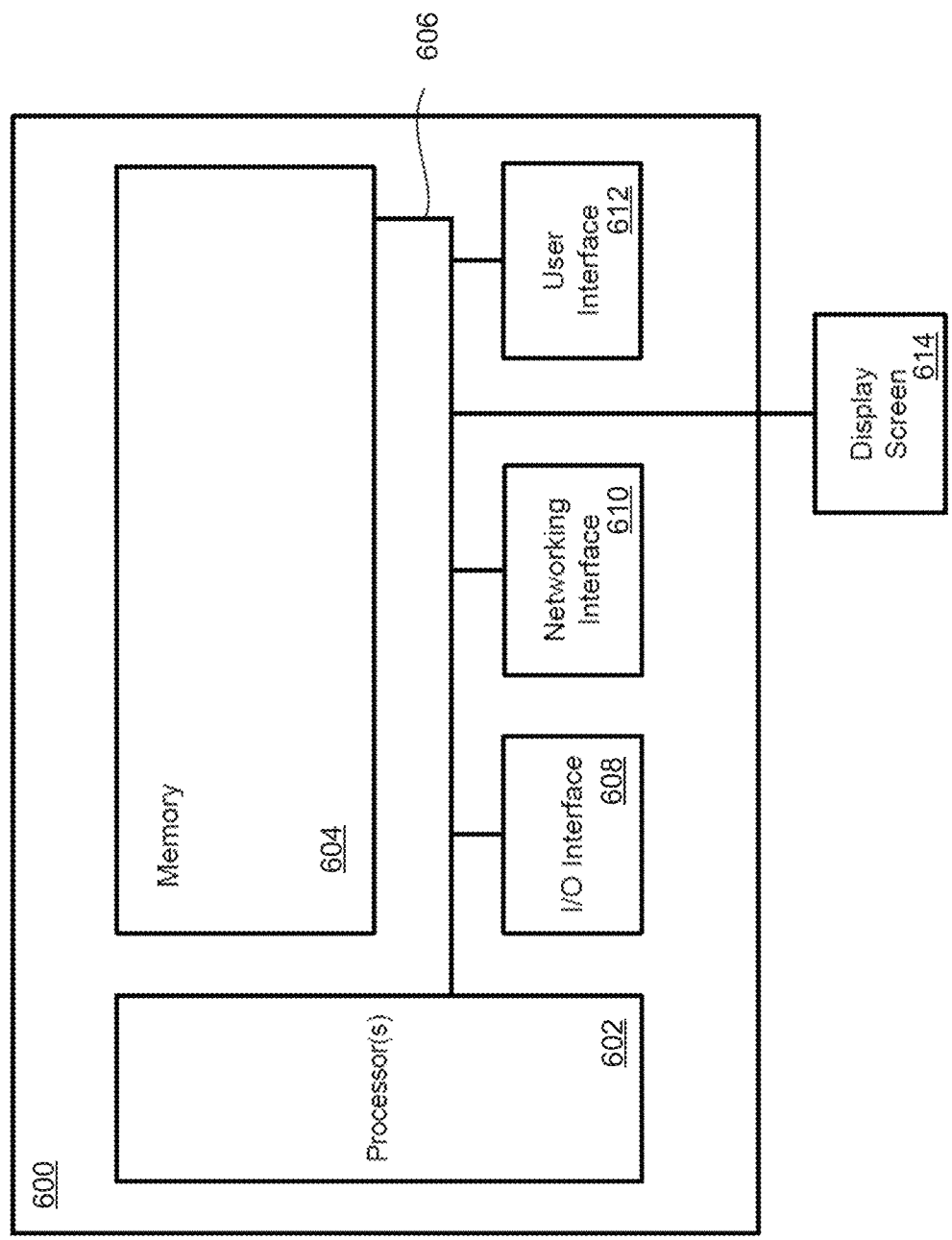
FIG. 6 is a schematic view of an exemplary device.

FIG. 6 depicts an exemplary system upon which embodiments of the present disclosure may be implemented. For example, the system of FIG. 6 may be a computer system. The system can include a memory controller 602, a plurality of memory 604, a processor 606, and circuitry 608. The circuitry can be configured to implement the hardware described herein for device 102 and device 202 of FIG. 1-2. Various embodiments of such systems for FIG. 6 can include smart phones, laptop computers, handheld and tablet devices, CPU systems, SoC systems, server systems, networking systems, storage systems, high capacity memory systems, or any other computational system.

The system can also include an I/O (input/output) interface 610 for controlling the I/O functions of the system, as well as for I/O connectivity to devices outside of the system. A network interface can also be included for network connectivity, either as a separate interface or as part of the I/O interface 610. The network interface can control network communications both within the system and outside of the system. The network interface can include a wired interface, a wireless interface, a Bluetooth interface, optical interface, and the like, including appropriate combinations thereof. Furthermore, the system can additionally include various user interfaces, display devices, as well as various other components that would be beneficial for such a system.

The system can also include memory in addition to memory 604 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 606 can be a single or multiple processors, and the memory can be a single or multiple memories. The local communication interface can be used as a pathway to facilitate communication between any of a single processor, multiple processors, a single memory, multiple memories, the various interfaces, and the like, in any useful combination.

The disclosed embodiments may be implemented, in some cases, in hardware, firmware, software, or any combination thereof. Portions of the disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 7:
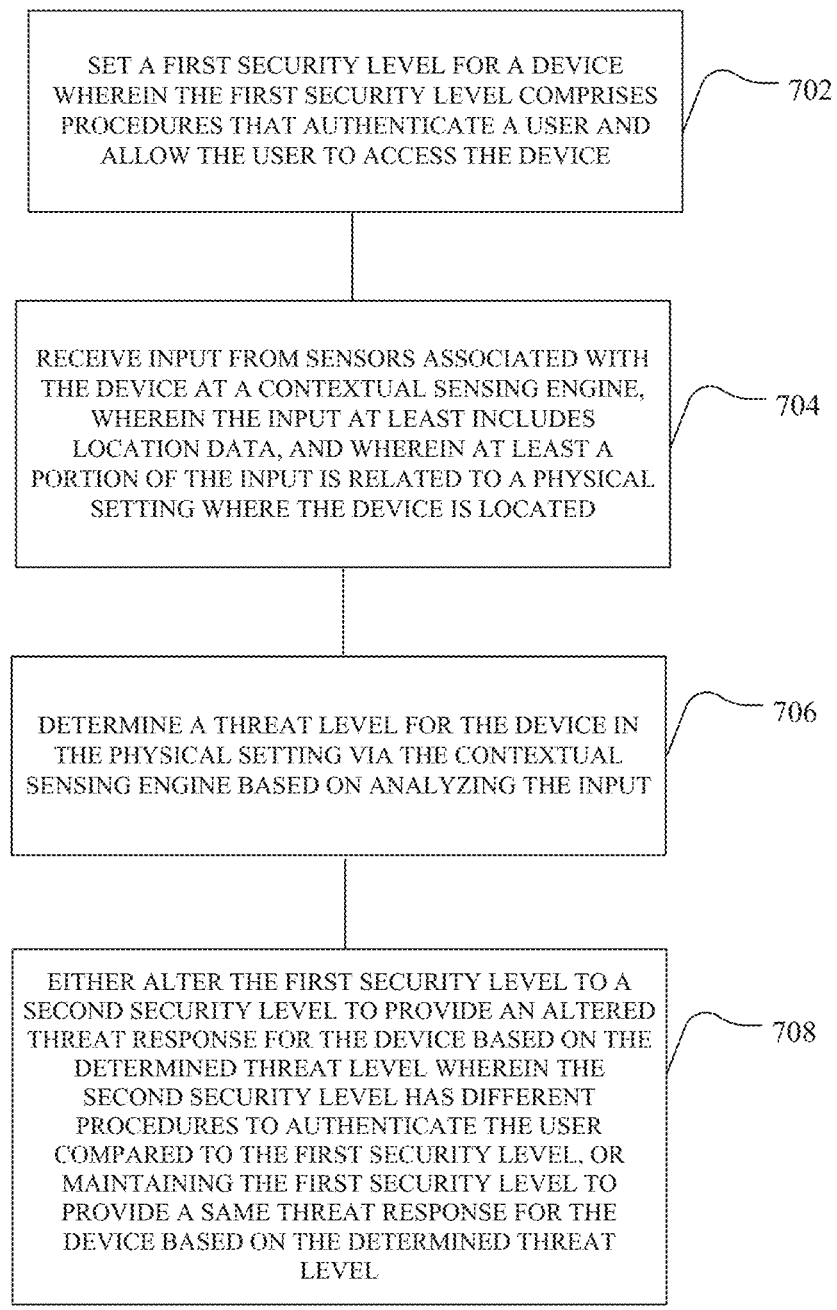
FIG. 7 is a representation of steps of an exemplary method for a self-adaptive security framework for a device.

FIG. 7 depicts a flowchart 700 of a method a self-adaptive security framework for a device. The method can be executed as instructions on a machine, where the instructions are included on at least one computer readable medium or one non-transitory machine-readable storage medium. In one embodiment, the circuitry 608 of FIG. 6 is configured to carry out the steps of FIG. 10. Moreover, the devices depicted in FIGS. 1-2 may be employed to carry out the steps of FIG. 7. The method can include the operation of: set a first security level for a device wherein the first security level comprises procedures that authenticate a user and allow the user to access the device, as in block 702. The method can include the operation of: receive input from sensors associated with the device at a contextual sensing engine, wherein the input at least includes location data, and wherein at least a portion of the input is related to a physical setting where the device is located, as in block 704. The method can include the operation of: determine a threat level for the device in the physical setting via the contextual sensing engine based on analyzing the input, as in block 706. The method can include the operation of: either alter the first security level to a second security level to provide an altered threat response for the device based on the determined threat level wherein the second security level has different procedures to authenticate the user compared to the first security level, or maintaining the first security level to provide a same threat response for the device based on the determined threat level, as in block 708. It should be appreciated that the steps of FIG. 7 may not include all of the steps depicted nor in the order in which they are depicted. Flowchart 7 may further include the step of receive additional input from the sensors, determine a change to the threat level, and alter the second security level to a third security level.

EXAMPLES

The following examples pertain to specific embodiments and point out specific features, elements, or steps that can be used or otherwise combined in achieving such embodiments.

In one example, there is provided a method for a self-adaptive security framework for a device, comprising:
setting a first security level for a device wherein the first security level comprises procedures that authenticate a user and allow the user to access the device;
receiving input from sensors associated with the device at a contextual sensing engine, wherein the input at least includes location data, and wherein at least a portion of the input is related to a physical setting where the device is located;
determining a threat level for the device in the physical setting via the contextual sensing engine based on analyzing the input; and either
altering the first security level to a second security level to provide an altered threat response for the device based on the determined threat level wherein the second security level has different procedures to authenticate the user compared to the first security level, or maintaining the first security level to provide a same threat response for the device based on the determined threat level.

In one example a method further comprising:
receiving additional input from the sensors;
determining a change to the threat level; and
altering the second security level to a third security level.

In one example of a method the threat level is selected from a predetermined group of threat levels consisting of: unreliable, tertiary-reliance, alter-reliance, and self-assured.

In one example of a method each of the predetermined group of threat levels has a corresponding security level to response to a type of threat.

In one example of a method the input is selected from the group of data consisting of: environmental temperature data, location data, social network data, calendar data event data, biometric data related to the user, body temperature data, heart rate data, image data, perceptual computing data, time data, accelerometer data, movement data, WiFi data, Internet Protocol (IP) address data, Global Navigation Satellite System (GNSS) data, Global Positioning System (GPS) data, watch dog timer data, and any combination thereof.

In one example of a method the procedures to authenticate a user for the first security level or the second security level are selected from the group of authentication procedures consisting of: no authentication, a swipe, two-factor authentication, a single password, gait authentication, active theft detection, a personal identification number authentication, a strong password, voice authentication, fingerprint authentication, biometric authentication, and any combination thereof.

In one example of a method the procedures for the second security level initiate a response in the device wherein the response is selected from the group of responses consisting of: hibernation, total memory encryption, network sync removal, auto-power down, and theft detection initiation.

In one example of a method the contextual sensing engine employs a Bayesian context miner.

In one example of a method the contextual sensing engine employs a linear regression model based on the device and the environment where the device will be used.

In one example of a method the contextual sensing engine employs a non-linear regression model based on the device and the environment where the device will be used.

In one example of a method the contextual sensing engine normalizes data of the input and places the data in a cross correlation matrix for the determining the threat level.

In one example of a method the input is sampled regularly at predetermined intervals of time.

In one example of a method the determining the threat level is based on a winner take all approach wherein a highest threat level is determined to be the threat level.

In one example of a method the procedures for the first security level are more stringent compared to the procedures for second security level.

In one example of a method the procedures for the first security level are less stringent compared to the procedures for second security level.

In one example of a method the altering the first security level to the second security level employs a continuum of software policies that can be enforced to allow or restrict certain applications executing at the device to be run based on a context in which the device is used.

In one example, there is provided a non-transitory computer-usable storage medium having instructions embodied therein that when executed cause a computer system to perform a method for a self-adaptive security framework for a device, the method comprising:
setting a first security level for a device wherein the first security level comprises procedures that authenticate a user allow and the user to access the device;
receiving input from sensors associated with the device at a contextual sensing engine, wherein the input at least includes location data, and wherein at least a portion of the input is related to a physical setting where the device is located;
determining a threat level for the device in the physical setting via the contextual sensing engine based on analyzing the input; and either
altering the first security level to a second security level to provide an altered threat response for the device based on the determined threat level wherein the second security level has different procedures to authenticate the user compared to the first security level, or maintaining the first security level to provide a same threat response for the device based on the determined threat level.

In one example of a non-transitory computer-usable storage medium further comprising:
receiving additional input from the sensors;
determining a change to the threat level; and
altering the second security level to a third security level.

In one example of a non-transitory computer-usable storage medium the threat level is selected from a predetermined group of threat levels consisting of: unreliable, tertiary-reliance, alter-reliance, and self-assured.

In one example of a non-transitory computer-usable storage medium each of the predetermined group of threat levels has a corresponding security level to response to a type of threat.

In one example of a non-transitory computer-usable storage medium the input is selected from the group of data consisting of: environmental temperature data, location data, social network data, calendar data, event data, biometric data related to the user, body temperature data, heart rate data, image data, perceptual computing data, time data, accelerometer data, movement data, WiFi data, Internet Protocol (IP) address data, Global Navigation Satellite System (GNSS) data, Global Positioning System (GPS) data, watch dog timer data, and any combination thereof.

In one example of a non-transitory computer-usable storage medium the procedures to authenticate a user for the first security level or the second security level are selected from the group of authentication procedures consisting of: no authentication, a swipe, two-factor authentication, a single password, gait authentication, active theft detection, a personal identification number authentication, a strong password, voice authentication, fingerprint authentication, biometric authentication, and any combination thereof.

In one example of a non-transitory computer-usable storage medium the procedures for the second security level initiate a response in the device wherein the response is selected from the group of responses consisting of: hibernation, total memory encryption, network sync removal, auto-power down, and theft detection initiation.

In one example of a non-transitory computer-usable storage medium the contextual sensing engine employs a Bayesian context miner.

In one example of a non-transitory computer-usable storage medium the contextual sensing engine employs a linear regression model based on the device and the environment where the device will be used.

In one example of a non-transitory computer-usable storage medium the contextual sensing engine employs a non-linear regression model based on the device and the environment where the device will be used.

In one example of a non-transitory computer-usable storage medium the contextual sensing engine normalizes data of the input and places the data in a cross correlation matrix for the determining the threat level.

In one example of a non-transitory computer-usable storage medium the input is sampled regularly at predetermined intervals of time.

In one example of a non-transitory computer-usable storage medium the determining the threat level is based on a winner take all approach wherein a highest threat level is determined to be the threat level.

In one example of a non-transitory computer-usable storage medium the procedures for the first security level are more stringent compared to the procedures for second security level.

In one example of a non-transitory computer-usable storage medium the procedures for the first security level are less stringent compared to the procedures for second security level.

In one example of a non-transitory computer-usable storage medium the altering the first security level to the second security level employs a continuum of software policies that can be enforced to allow or restrict certain applications executing at the device to be run based on a context in which the device is used.

In one example, there is provided, a device for a self-adaptive security, comprising:
  at least one sensor configured to gather input wherein at least a portion of the input is related to a physical setting where the device is located;
  a processor and memory configured to:
    set a first security level for the device wherein the first security level comprises procedures that authenticate a user and allow the user to access the device;
    receive the input from the at least one sensor at a contextual sensing engine;
    determine a threat level for the device in the physical setting via the contextual sensing engine based on analyzing the input; and either
    alter the first security level to a second security level to provide an altered threat response for the device based on the determined threat level wherein the second security level has different procedures to authenticate the user compared to the first security level, or maintain the first security level to provide a same threat response for the device based on the determined threat level.

In one example of a device the device is selected from a group of devices consisting of: a mobile device, a smart phone, a laptop, a tablet computer, and an Internet of Things (IoT) device.

In one example of a device the at least one sensor is selected from the group of sensors consisting of: a gyro, an accelerometer, a thermometer, a camera, a heart rate monitor, a network card, a Global Navigation Satellite System (GNSS) sensor, Global Positioning System (GPS) sensor, and a clock.

In one example of a device the at least one sensor is one of a plurality of sensors associated with the device.

In one example of a device the processor and the memory are further configured to:
  receive additional input from the at least one sensor;
  determine a change to the threat level; and
  alter the second security level to a third security level.

In one example of a device the threat level is selected from a predetermined group of threat levels consisting of: unreliable, tertiary-reliance, alter-reliance, and self-assured.

In one example of a device the predetermined group of threat levels has a corresponding security level to response to a type of threat.

In one example of a device the input is selected from the group of data consisting of: environmental temperature data, location data, social network data, calendar data, event data, biometric data related to the user, body temperature data, heart rate data, image data, perceptual computing data, time data, accelerometer data, movement data, WiFi data, Internet Protocol (IP) address data, Global Navigation Satellite System (GNSS) data, Global Positioning System (GPS) data, watch dog timer data, and any combination thereof.

In one example of a device the procedures to authenticate a user for the first security level or the second security level are selected from the group of authentication procedures consisting of: no authentication, a swipe, two-factor authentication, a single password, gait authentication, active theft detection, a personal identification number authentication, a strong password, voice authentication, fingerprint authentication, biometric authentication, and any combination thereof.

In one example of a device the procedures for the second security level initiate a response in the device wherein the response is selected from the group of responses consisting of: hibernation, total memory encryption, network sync removal, auto-power down, and theft detection initiation.

In one example of a device the contextual sensing engine employs a Bayesian context miner.

In one example of a device the contextual sensing engine employs a linear regression model based on the device and the environment where the device will be used.

In one example of a device the contextual sensing engine employs a non-linear regression model based on the device and the environment where the device will be used.

In one example of a device the contextual sensing engine normalizes data of the input and places the data in a cross correlation matrix for the determining the threat level.

In one example of a device the input is sampled regularly at predetermined intervals of time.

In one example of a device the determining the threat level is based on a winner take all approach wherein a highest threat level is determined to be the threat level.

In one example of a device the procedures for the first security level are more stringent compared to the procedures for second security level.

In one example of a device the procedures for the first security level are less stringent compared to the procedures for second security level.

In one example of a device the altering the first security level to the second security level employs a continuum of software policies that can be enforced to allow or restrict certain applications executing at the device to be run based on a context in which the device is used.

What is claimed is:

1. A method for a self-adaptive security framework for a device, comprising:
    setting a first security level for a device wherein the first security level comprises procedures that authenticate a user and allow the user to access the device;
    receiving input from sensors associated with the device at a contextual sensing engine, wherein the input at least includes location data, and wherein at least a portion of the input is related to a physical setting where the device is located;
    determining a threat level for the device in the physical setting via the contextual sensing engine based on analyzing the input;
    altering the first security level to a second security level to provide an altered threat response for the device based on the determined threat level wherein the second security level has different procedures to authenticate the user compared to the first security level, wherein the procedures for the second security level initiate a response in the device wherein the response is selected from the group of responses consisting of: hibernation, total memory encryption, network sync removal, auto-power down, and theft detection initiation;
    receiving additional input from the sensors;
    determining a change to the threat level; and
    altering the second security level to a third security level.

2. The method as recited in claim 1, wherein the threat level is selected from a predetermined group of threat levels consisting of: unreliable, tertiary-reliance, alter-reliance, and self-assured.

3. The method as recited in claim 2, wherein each of the predetermined group of threat levels has a corresponding security level to response to a type of threat.

4. The method as recited in claim 1, wherein the input is selected from the group of data consisting of: environmental temperature data, location data, social network data, calendar data, event data, biometric data related to the user, body temperature data, heart rate data, image data, perceptual computing data, time data, accelerometer data, movement data, WiFi data, Internet Protocol (IP) address data, Global Navigation Satellite System (GNSS) data, Global Positioning System (GPS) data, watch dog timer data, and any combination thereof.

5. The method as recited in claim 1, wherein the procedures to authenticate a user for the first security level or the second security level are selected from the group of authentication procedures consisting of: no authentication, a swipe, two-factor authentication, a single password, gait authentication, active theft detection, a personal identification number authentication, a strong password, voice authentication, fingerprint authentication, biometric authentication, and any combination thereof.

6. The method as recited in claim 1, wherein the contextual sensing engine employs a Bayesian context miner.

7. The method as recited in claim 1, wherein the contextual sensing engine employs a linear regression model based on the device and the environment where the device will be used.

8. The method as recited in claim 1, wherein the contextual sensing engine employs a non-linear regression model based on the device and the environment where the device will be used.

9. The method as recited in claim 1, wherein the contextual sensing engine normalizes data of the input and places the data in a cross correlation matrix for the determining the threat level.

10. The method as recited in claim 1, wherein the input is sampled regularly at predetermined intervals of time.

11. The method as recited in claim 1, wherein the determining the threat level is based on a winner take all approach wherein a highest threat level is determined to be the threat level.

12. The method as recited in claim 1, wherein the procedures for the first security level are more stringent compared to the procedures for second security level.

13. The method as recited in claim 1, wherein the procedures for the first security level are less stringent compared to the procedures for second security level.

14. The method as recited in claim 1, wherein the altering the first security level to the second security level employs a continuum of software policies that can be enforced to allow or restrict certain applications executing at the device to be run based on a context in which the device is used.

15. A device for a self-adaptive security, comprising:
    at least one sensor configured to gather input wherein at least a portion of the input is related to a physical setting where the device is located;
    a processor and memory configured to:
    set a first security level for the device wherein the first security level comprises procedures that authenticate a user and allow the user to access the device;
    receive the input from the at least one sensor at a contextual sensing engine;
    determine a threat level for the device in the physical setting via the contextual sensing engine based on analyzing the input;
    alter the first security level to a second security level to provide an altered threat response for the device based on the determined threat level wherein the second security level has different procedures to authenticate the user compared to the first security level, wherein the procedures for the second security level initiate a response in the device wherein the response is selected from the group of responses consisting of: hibernation, total memory encryption, network sync removal, auto-power down, and theft detection initiation;
    receive additional input from the at least one sensor;
    determine a change to the threat level; and
    alter the second security level to a third security level.

16. The device as recited in claim 15, wherein the device is selected from a group of devices consisting of: a mobile device, a smart phone, a laptop, a tablet computer, and an Internet of Things (loT) device.

17. The device as recited in claim 15, wherein the at least one sensor is selected from the group of sensors consisting of: a gyro, an accelerometer, a thermometer, a camera, a heart rate monitor, a network card, a Global Navigation Satellite System (GNSS) sensor, Global Positioning System (GPS) sensor, and a clock.

18. The device as recited in claim 15, wherein the threat level is selected from a predetermined group of threat levels consisting of: unreliable, tertiary-reliance, alter-reliance, and self-assured.

19. The device as recited in claim 15, wherein each of the predetermined group of threat levels has a corresponding security level to response to a type of threat.

20. The device as recited in claim 15, wherein the input is selected from the group of data consisting of: environmental temperature data, location data, social network data, calendar data, event data, biometric data related to the user, body temperature data, heart rate data, image data, perceptual computing data, time data, accelerometer data, movement data, WiFi data, Internet Protocol (IP) address data, Global Navigation Satellite System (GNSS) data, Global Positioning System (GPS) data, watch dog timer data, and any combination thereof.

21. The device as recited in claim 15, wherein the procedures to authenticate a user for the first security level or the second security level are selected from the group of authentication procedures consisting of: no authentication, a swipe, two-factor authentication, a single password, gait authentication, active theft detection, a personal identification number authentication, a strong password, voice authentication, fingerprint authentication, biometric authentication, and any combination thereof.

22. The device as recited in claim 15, wherein the contextual sensing engine normalizes data of the input and places the data in a cross correlation matrix for the determining the threat level.

23. The device as recited in claim 15 wherein the input is sampled regularly at predetermined intervals of time.

24. The device as recited in claim 15, wherein the determining the threat level is based on a winner take all approach wherein a highest threat level is determined to be the threat level.

25. The device as recited in claim 15, wherein the altering the first security level to the second security level employs a continuum of software policies that can be enforced to allow or restrict certain applications executing at the device to be run based on a context in which the device is used.

* * * * *